(12) United States Patent
Slayter et al.

(10) Patent No.: US 8,613,142 B2
(45) Date of Patent: Dec. 24, 2013

(54) METHODS FOR CLUSTER GEAR TIMING AND MANUFACTURING

(75) Inventors: Matthew Slayter, Rockford, IL (US); Charles E. Long, Rockford, IL (US)

(73) Assignee: Hamilton Sundstrand Corporation, Windsor Locks, CT (US)

( * ) Notice: Subject to any disclaimer, the term of this patent is extended or adjusted under 35 U.S.C. 154(b) by 614 days.

(21) Appl. No.: 12/847,448

(22) Filed: Jul. 30, 2010

(65) Prior Publication Data

US 2012/0023747 A1 Feb. 2, 2012

(51) Int. Cl.
*B21D 53/28* (2006.01)

(52) U.S. Cl.
USPC ............................................... 29/893.1

(58) Field of Classification Search
USPC ............................................... 29/893.1
See application file for complete search history.

(56) References Cited

U.S. PATENT DOCUMENTS

| 4,524,643 A | 6/1985 | Ziegler et al. |
| 6,537,027 B2 | 3/2003 | Telakowski |
| 6,681,579 B2 | 1/2004 | Lane et al. |
| 6,694,746 B2 | 2/2004 | Reed et al. |
| 7,076,875 B2 * | 7/2006 | Puetz et al. ............... 29/893.35 |

* cited by examiner

*Primary Examiner* — David Bryant
*Assistant Examiner* — Moshe Wilensky
(74) *Attorney, Agent, or Firm* — Kinney & Lange, P.A.

(57) ABSTRACT

A method of manufacturing a gear cluster from a first gear body and a second gear body comprises producing a first set of gear teeth on the first gear body such that each tooth on the first set of gear teeth has a first pitch point. The second gear body is axially aligned with the first gear body. A timing position for a second set of gear teeth on the second gear body is determined by dimensioning from the first set of gear teeth. A second set of gear teeth on the second gear body is produced based on the timing position and each tooth on the second set of gear teeth has a second pitch point. The gear cluster is inspected for timing position by measuring a reference dimension between the first pitch point and the second pitch point.

20 Claims, 6 Drawing Sheets

METHODS FOR CLUSTER GEAR TIMING AND MANUFACTURING

BACKGROUND

The present invention relates to timing of teeth in gear assemblies. In particular, the present invention is directed to timing of teeth on gears assembled in a cluster such as are used in epicyclic gear systems.

Epicyclic gear systems comprise a plurality of planet gears disposed within a ring gear to surround a central sun gear. In typical configurations, the sun gear is used as an input while the ring gear is used as an output, with the planet gears providing a gear reduction and directional reversal from the input to output. Epicyclic gear systems can, however, have different configurations with different input sources and output sources as well. Gear teeth on the planet gears, therefore, must align with teeth on both the sun gear and the ring gear. More specifically, gear tooth position about the gear axis on each planet gear must be the same, or within a tolerance band, such that timing with the sun gear and ring gear for each planet gear is the same. Consistency between tooth positions reduces uneven loading on the planet gears. Disparate loading of one of the planet gears has the effect of removing the other planet gears from the system or otherwise reducing loading on those gears. The loaded gear then suffers increased stress and wear and the epicyclic gear system operates inefficiently.

The effect of gear tooth timing in epicyclic gear systems is compounded when planet gear clusters are used. Planet gear clusters typically comprise a large diameter planet gear that engages the sun gear, and a small diameter planet gear, which is axially aligned with and fixed to the large diameter planet gear, that engages with the ring gear. As such, it becomes necessary to make sure that the large diameter planet gear teeth consistently engage with the sun gear, and that the small diameter planet gear teeth consistently engage with the ring gear, while ensuring that the gear teeth on the large diameter and small diameter planet gears are properly aligned, or timed, with each other.

Conventional methods from timing gear cluster teeth involve aligning the centers of the small diameter gear teeth with the centers of the large diameter gear teeth. In such a scheme, the pitch points along the sides of the gear teeth are timed adequately when each gear tooth in the large diameter and small diameter planet gear is the same, such as at the nominally dimensioned width or thickness between flanks. However, when the gear tooth on the large diameter planet gear and the gear tooth on the small diameter planet gear vary from the nominal dimension to some other value, even within acceptable tolerances, alignment of the pitch points will vary from pair to pair. Significant variation in pitch alignment from pair to pair can lead to uneven loading of the planet gear clusters when assembled within an epicyclic gear system.

SUMMARY

The present invention is directed to a method of manufacturing a gear cluster from a first gear body and a second gear body. The method comprises producing a first set of gear teeth on the first gear body such that each tooth on the first set of gear teeth has a first pitch point. The second gear body is axially aligned with the first gear body. A timing position for a second set of gear teeth on the second gear body is determined by dimensioning from the first set of gear teeth. A second set of gear teeth on the second gear body is produced based on the timing position and each tooth on the second set of gear teeth has a second pitch point. The gear cluster is inspected for timing position by measuring a reference dimension between the first pitch point and the second pitch point.

DETAILED DESCRIPTION

Figure 1:
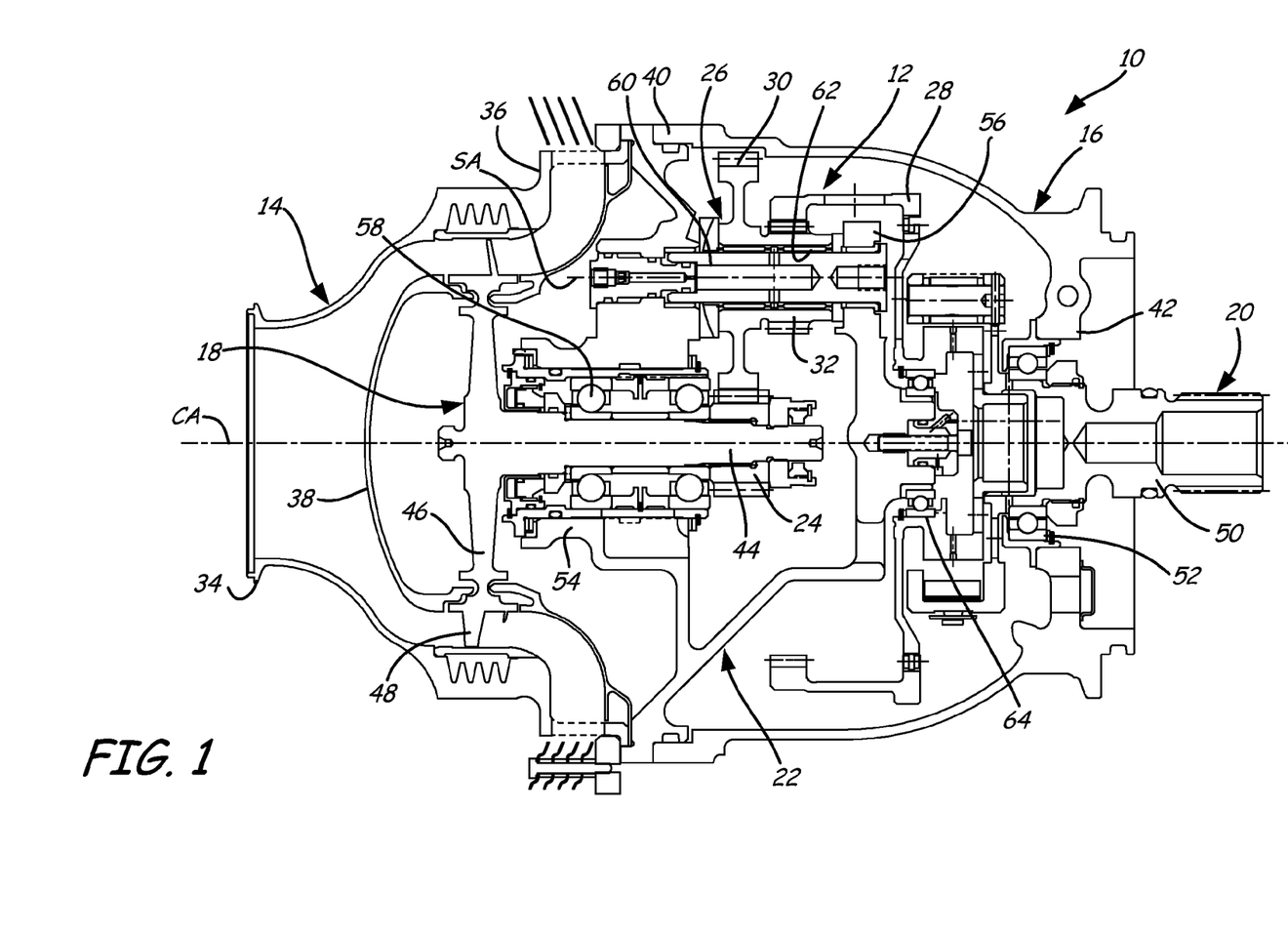
FIG. 1 is side cross-sectional view of a gas turbine engine starter having an epicyclic gear system with gear teeth timed using methods of the present invention.

FIG. 1 is side cross-sectional view of gas turbine engine starter 10 having epicyclic gear system 12 with gear teeth timed using methods of the present invention. Starter 10 also includes turbine housing 14, gear housing 16, turbine 18, output 20 and frame 22. Gear system 12 includes sun gear 24, planet gear cluster 26, and ring gear 28. Planet gear cluster 26 includes large diameter gear 30 and small diameter gear 32. Turbine housing 14 includes inlet 34, outlet 36 and fairing 38. Turbine casing 16 includes opening 40 and opening 42. Turbine 18 includes shaft 44, rotor disk 46 and blades 48. Output 20 includes shaft 50 and bearings 52. Frame 22 includes shaft support 54 and pin support 56.

Turbine housing 14 provides a duct through which air used to drive starter 10 flows. Inlet 34 is connected to a source of pressurized air, such as an environmental control system in an aircraft or a ram air system. Fairing 38 is disposed within housing 14 to direct air around turbine 18 and toward blades 48. Outlet 36 directs air out of housing 14 and, for example, overboard from the aircraft. Gear housing 16 is connected to outlet 36 of turbine housing 14 at opening 40. Gear housing 16 terminates at opening 42, which provides a platform for mounting bearings 52 that support shaft 50. Frame 22 extends into gear housing 16 and includes shaft support 54, which comprises an annular structure for receiving bearings 58, and pin support 56, which comprises an annular structure for receiving pin 60. Shaft support 54 is disposed along central axis CA, around which inlet 34 and opening 42 are concentrically disposed. Pin support 56, which comprises one of three pin supports formed by frame 22, is displaced radially from shaft support 54 such that satellite axis SA is parallel with central axis CA.

Bearings 58 receive shaft 44 of turbine 18 such that rotor 46 extends blades 48 into the flow of air within housing 14. As such, turbine 18 is held fixed within starter 10, but is free to rotate within bearings 58. Sun gear 24 is fixed to shaft 44 such that sun gear 24 rotates about central axis CA. Pin 60 is positioned within support 56 and extends axially along satellite axis SA and parallel to central axis CA, to engage support 54. Thus, pin 60 is fixed within starter 10. Planet gear cluster 26 is disposed on pin 60 and is configured to rotate about roller bearings 62 surrounding pin 60. Likewise, two other planet gear clusters (FIG. 2) are disposed on other pins within the system. Large diameter gear 30 extends radially outward from pin 60 to engage sun gear 24. Thus, planet gear cluster 26 rotates about satellite axis SA in an opposite rotational direction as sun gear 24. Small diameter gear 32 is rigidly connected to large diameter gear 30 and is displaced axially along satellite axis SA. Ring gear 28 is disposed concentrically around central axis CA to engage small diameter gear 32 of planet gear cluster 26, as well as the other planet gear clusters of the system. Ring gear 28 includes an annular structure that extends axially past support 56 and radially inward toward output 20. Ring gear 28 is supported by frame 22 by bearings 64. Output shaft 50 is joined to ring gear 28 and to a gearbox of a gas turbine engine to provide a rotational input to initiate combustion within the engine. Connected as such, sun gear 24, planet gear cluster 26, the other planet gear clusters and ring gear 28 rotate in unison to convert rotation of turbine 18 into shaft rotation at output 20.

Methods for manufacturing planet gear clusters of the present invention provide for better timing between gear teeth on large diameter planet gear 30 and small diameter planet gear 32. Although the invention is described with respect to an epicyclic gear system comprising sun, planet and ring gears that drive an engine starter, the methods of the present invention may be used in other types of epicyclic gear systems that drive other systems. The methods of the present invention extend to any type of gear cluster having the drive side of the driven gear located on the opposite side of the drive side of the driving gear in the gear cluster, as is described in the exemplary embodiments of the present invention.

Figure 2:
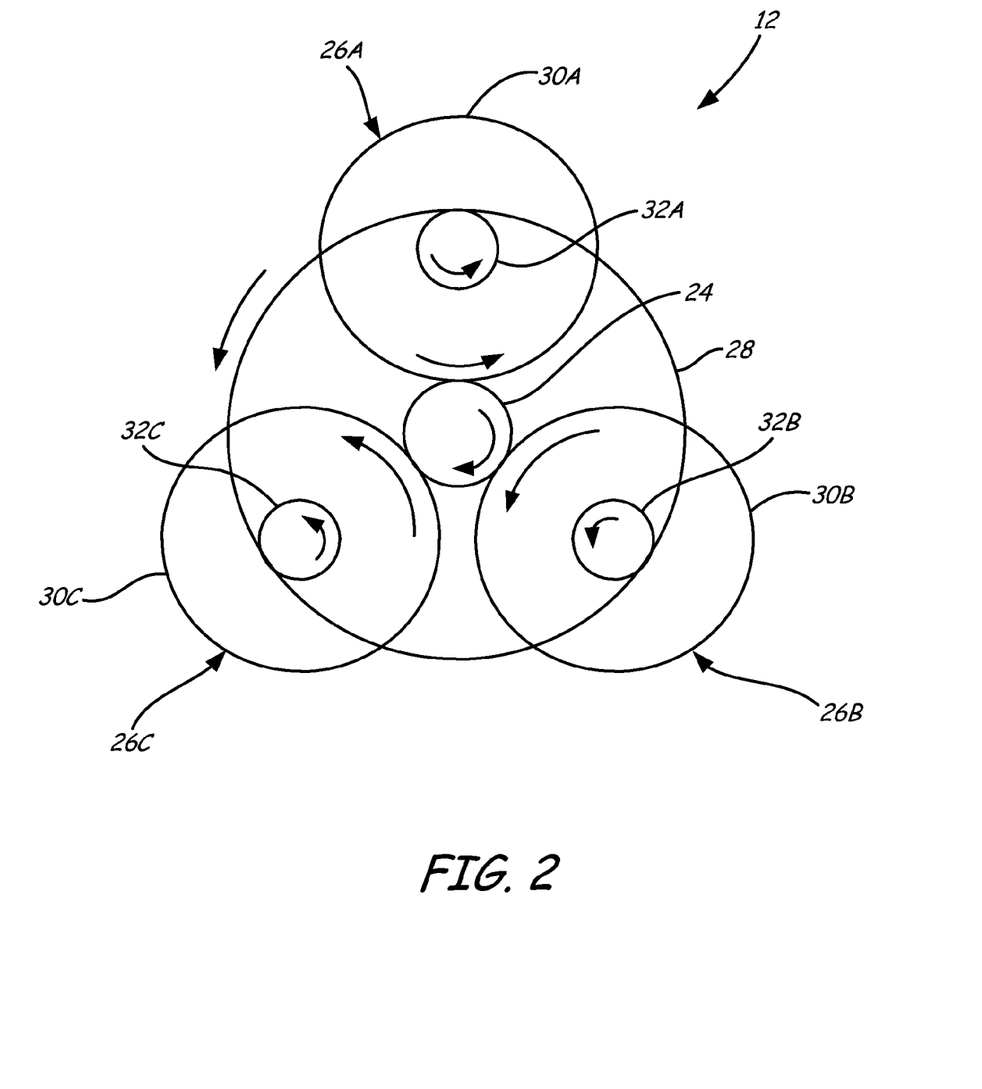
FIG. 2 is a schematic front view of a ring gear, a sun gear and planetary gear clusters used in the epicyclic gear system of the starter of FIG. 1.

FIG. 2 is a schematic front view of ring gear 28, sun gear 24 and planetary gear clusters 26A-26C used in epicyclic gear system 12 of starter 10 of FIG. 1. In the depicted embodiment, sun gear 24 rotates clockwise by operation of turbine 18 (FIG. 1). Gear teeth on the outer circumference of sun gear 24 engage gear teeth on the outer circumference of large diameter planet gears 30A-30C of planet gear clusters 26A-26C causing counter-clockwise rotation. The rigid connection between large diameter planet gears 30A-30C and small diameter planet gears 32A-32C, respectively, causes small diameter planet gears 32A-32C to rotate in the counter-clockwise direction as well, but in a plane behind sun gear 24 and large diameter planet gears 30A-30C. Gear teeth on the outer circumference of small diameter planet gears 32A-32C mesh with gear teeth on the inner circumference of ring gear 28, causing counter-clockwise rotation of ring gear 28.

Efficient operation of the mechanism including starter 10 and epicyclic gear system 12, or other mechanisms including such a gear system, depends partially on the operation of epicyclic gear system 12. In particular, precise alignment of planet gear clusters 26A-26C with sun gear 24 and ring gear 28 allows for more effective transfer of power from turbine 18 to output 20 (FIG. 1). Furthermore, greater alignment between these gears prolongs the effective life of the gear system. Alignment of the gears depends on the gear teeth, and particular the tolerance of each tooth. The methods of the present invention ensure that gear teeth on large diameter planet gears 30A-30C time with gear teeth on small diameter planet gears 32A-32C in a consistent manner between gear clusters 26A-26C. As such, timing between gear clusters 26A-26C, sun gear 24 and ring gear 28 will improve.

Figure 3:
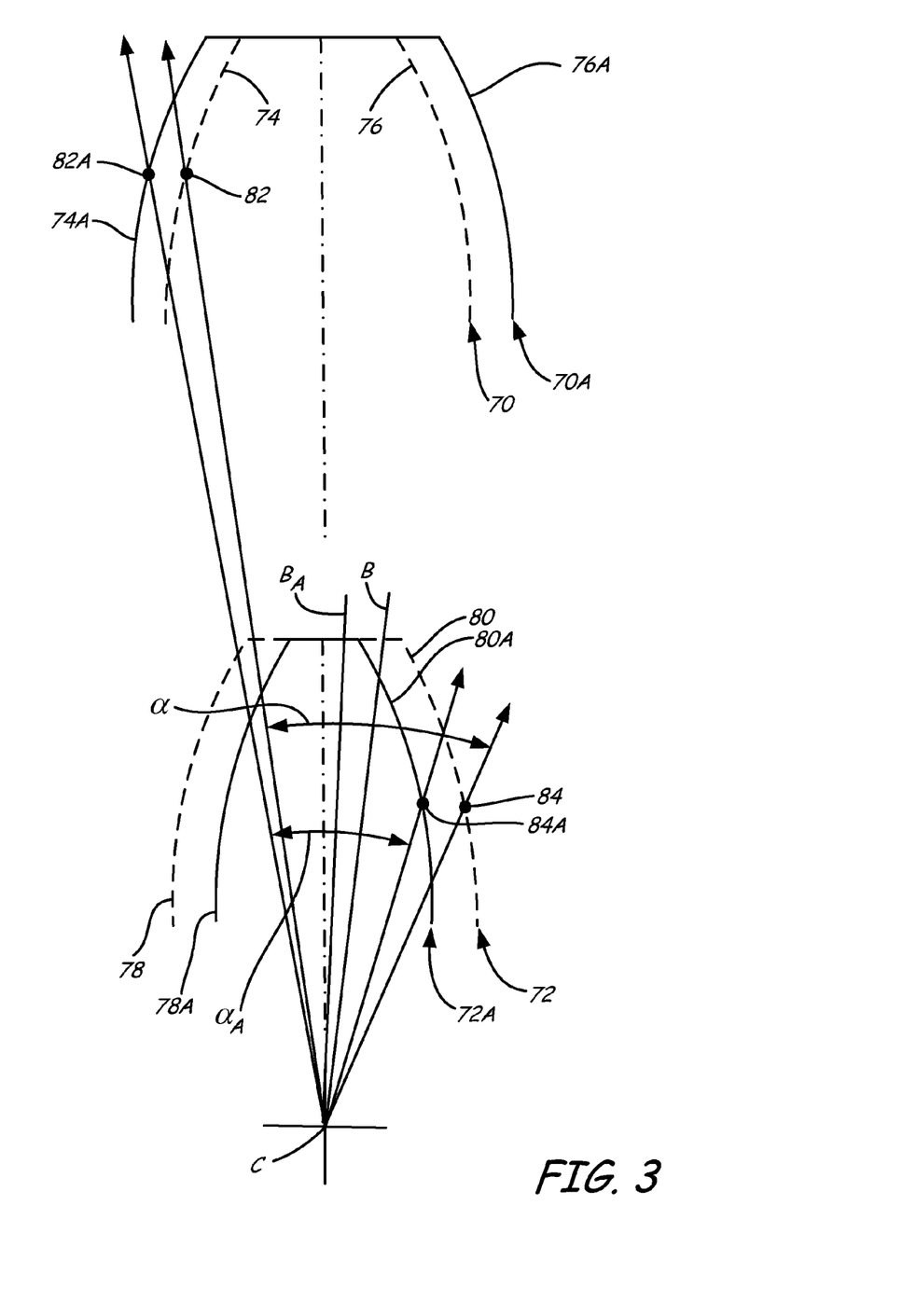
FIG. 3 is a schematic front view of a planetary gear cluster showing dimensional tolerances of teeth on large diameter and small diameter planet gears.

FIG. 3 is a schematic front view of gear tooth 70 and gear tooth 72 showing dimensional tolerances within a planet gear cluster. Gear tooth 70 is shown in dashed lines having a nominal thickness formed by tooth walls, or flanks, 74 and 76. Gear tooth 72 is shown in dashed lines having a nominal thickness formed by tooth walls, or flanks, 78 and 80. Gear tooth 70 represents a typical gear tooth used in a large diameter planet gear of a gear cluster, while gear tooth 72 represents a typical gear tooth used in a small diameter planet gear of the same gear cluster. As such, gear tooth 70 and gear tooth 72 are disposed on outer circumference edges of circular gear bodies sharing gear cluster center C. FIG. 3 is shown for illustrative purposes and distances and dimensions are exaggerated or abbreviated for clarity.

Gear tooth 70 is driven through engagement with a sun gear on the drive side of the large diameter planet gear. For illustrative purposes, gear tooth 70 is driven in a clockwise direction by impact of the sun gear at pitch point 82 on tooth wall 74 for the nominal tooth. Gear tooth 72 is driven in the clockwise direction through coupling of the large diameter planet gear with the small diameter planet gear. Gear tooth 72 drives a ring gear that engages with a drive side of the small diameter planet gear. Gear tooth 72 drives the ring gear at pitch point 84 on tooth wall 80 for the nominal tooth. Thus, gear tooth 70 is driven on an opposite side as gear tooth 72 drives, resulting in uniform rotation that can be reversed.

As mentioned above, tooth walls 74 and 76, and 78 and 80 represent the nominal thickness dimensions of gear teeth 70 and 72, respectively. The nominal thickness typically represents the dimension for which the gear tooth is designed. If each gear tooth were made at the nominal thickness, the gear cluster would operate optimally by spreading loads equally to between gear clusters in epicyclic gear system 12. Thus, timing angle α between pitch points 82 and 84 for each pair of gear teeth on the large diameter planet gear and the small diameter planet gear would be equal. Furthermore, timing angle α between gear clusters 26A, 26B and 26C would also be the same. However, due to limitations in manufacturing processes, gear teeth on each gear will not be made to the exact same thickness dimension in each gear cluster. Rather, the gear tooth thickness on each gear will fall within a tolerance band of acceptable thicker and thinner dimensions.

Gear tooth 70 is also shown in solid lines as gear tooth 70A comprising tooth walls 74A and 76A having a greater than nominal thickness. Gear tooth 72 is also shown in solid lines as gear tooth 72A comprising tooth walls 78A and 80A having a smaller than nominal thickness. Gear tooth 70A is driven at pitch point 82A on tooth wall 74A for the wider tooth. Gear tooth 72A is driven at pitch point 84A on tooth wall 80A for the narrower tooth. Gear teeth 70A and 72A represent gear teeth at opposite ends of the acceptable tolerance band. The thickness of each gear tooth on the large diameter and small diameter planet gears can potentially vary to be anywhere within the tolerance band. As such, each pair of gear teeth 70A and 72A will form a slightly different timing angle. Differences between timing angles within a gear cluster will typically be small as each tooth is machined with the same process. However, timing angles between gear clusters can vary more due to machining processes that can occur at different times or with different machines. For example, gear tooth 70A and gear tooth 72A will form timing angle $\alpha_A$ such as might be found on gear cluster 26A, while gear tooth 70 and 72 form timing angle α that may be found on gear cluster 26B or 26C. As shown in FIG. 3, the bisection line $B_A$ for timing angle $\alpha_A$ on gear teeth 70A and 72A is shifted from bisection line B for timing angle α on gear teeth 70 and 72. Bisection lines α and $\alpha_A$ provide indicators representing tooth timing for a gear cluster. The shifting of bisection line $B_A$ from the nominal bisection line B can vary between planet gear clusters based on the variation from the nominal tooth thickness. If the variation is too large, indicated by a large difference between timing angles, performance of the epicyclic gear system will degrade as tooth loading will shift from even distribution amongst planet gear clusters to overloading a single planet gear cluster.

As discussed previously, typical timing of the large diameter planet gear and the small diameter planet gear was performed based on the aligning the centers of the gear teeth. This, however, did not account for variances in alignment of pitch points 82 and 84 as illustrated with bisection line B and bisection line $B_A$. The present invention provides several methods of timing gear teeth on different gears within a gear cluster by utilizing the pitch points to time the gears.

Figure 4:
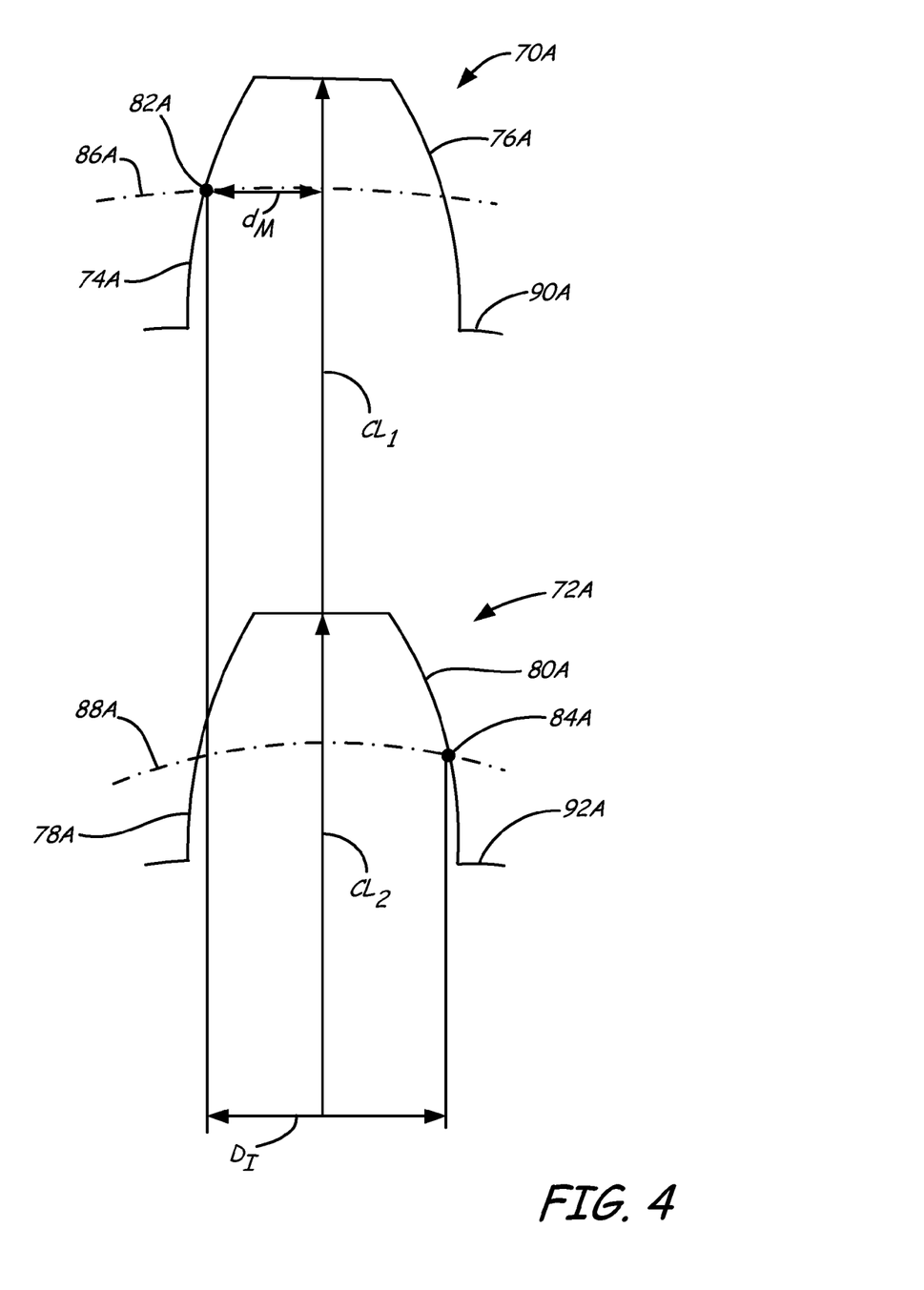
FIG. 4 is a schematic front view of a planetary gear cluster having teeth timed according to a first embodiment of the present invention involving sorting and assembling.

FIG. 4 is a schematic front view of a planetary gear cluster having gear teeth 70A and 72A timed according to a first embodiment of the present invention involving sorting and assembling. Gear tooth 70A comprises tooth walls 74A and 76A, pitch point 78A, and pitch curve 86A. Gear tooth 72A comprises tooth walls 78A and 80A, pitch point 84A, and pitch curve 88A. Gear tooth 70A extends radially from an outer circumference edge of gear body 90A, which comprises a large diameter gear of a planetary gear cluster. Gear tooth 72A extends radially from an outer circumference edge of gear body 92A, which comprises a small diameter gear of a planetary gear cluster. Only portions of gear bodies 90A and 92A supporting gear teeth 70A and 72A, respectively, are shown in FIG. 4. Centerlines CL1 and CL2 extend through the centers of gear teeth 70A and 72A, respectively.

Gear body 92A comprises a conventional circular spur gear having a set of gear teeth (not shown) extending radially from the center of gear body 92A. Gear body 92A is manufactured using any suitable technique. For example gear body 92A can be cast, heat treated and rough cut to form gear tooth 72A, as well as the other gear teeth around the outer circumference edge. Gear body 92A can also be finished machined to shape gear tooth 72A to final dimensions, somewhere within the tolerance band of the nominal dimension. Gear tooth 72A is manufactured on gear body 92A by measuring the horizontal manufacturing distance (parallel to a line tangent to pitch curve 88A) from the center point of gear tooth 72A to the position on pitch curve 88A where pitch point 84A should be located. Gear body 90A also comprises a conventional circular spur gear having a set of gear teeth (not shown) extending radially from the center of gear body 90A. Gear body 90A is also manufactured using any suitable technique. For example, gear body 90A can be cast, heat treated and rough cut to form gear tooth 70A, as well as the other gear teeth around the outer circumference edge. However, gear tooth 70A is not machined to final dimensions until after gear body 90A is assembled with gear body 92A to form a gear cluster.

Gear body 92A is assembled with gear body 90A by any suitable method. For example, gear bodies 90A and 92A can be welded together. The timing, or specific rotational position of gear body 92A with respect to gear body 90A is determined using the center of each gear tooth, through which center lines $CL_1$ and $CL_2$ extend, respectively. For example, the halfway point between tooth wall 78A and tooth wall 80A is aligned radially with the halfway point between tooth wall 74A and tooth wall 76A. In such a manner, gear tooth 70A and 72A are rough timed before gear bodies 90A and 92A are assembled using the rough shape of gear tooth 70A. Final timing of gear teeth 70A and 72A is determined when gear tooth 70A is machined to its final thickness.

In prior art methods, the final dimensions of gear tooth 70A would be produced based on the timing of the center points of each tooth. For example, the position at which tooth wall 74A would be machined would be measured from the center point of tooth 70A. Finally, in prior art methods, planet gears for each epicyclic gear system would be inspected based on dimensioning measurements from the midpoint of each gear tooth. So long as the tooth thickness of each gear cluster fell within tolerance, the gear would be used in an epicyclic gear system. However, as noted above, these methods failed to accommodate variations in the position of pitch points 82A and 84A based on machining tolerances that resulted in variation in the distance between tooth walls 74A and 76A, and 78A and 80A. Thus, uneven distribution of loading in the epicyclic gear system could potentially result.

In the present invention, assembly of the epicyclic gear system is determined based on dimensioning from pitch point 82A and pitch point 84A for each planet gear. In the embodiment of FIG. 4, the final dimensions of gear tooth 72A can be machined using any technique. For example, gear tooth 70A is manufactured on gear body 90A by measuring the horizontal manufacturing distance $d_M$ from the center point of gear tooth 70A to the position on pitch curve 86A where pitch point 82A should be located, as is done in the prior art. Gear tooth 70A can also be manufactured by measuring between pitch point 82A and pitch point 84A, as is discussed with reference to FIGS. 5 and 6. After gear tooth 70A is manufactured to final dimensions, the gear cluster is inspected to determine the straight line horizontal distance $D_I$ between pitch point 82A and 84A. In the embodiment shown, distance $D_I$ comprises a length parallel to a line tangent to pitch curve 86A. Gear clusters are then sorted into groups having similar values for distance $D_I$. Gear clusters from each group are then assembled into the same epicyclic gear system to ensure better alignment and meshing of the gear teeth. Thus, better load sharing amongst the gear clusters is achieved.

In the embodiment of FIG. 4, centerlines $CL_1$ and $CL_2$ are used to provide rough timing and precise timing between teeth 70A and 72A. Inspection dimension $D_I$ is used only to verify the manufacturing result. Thus, gear clusters having inspection dimensions $D_I$ that close can be matched for assembly into a gear system. The method of FIG. 4 provides a low cost and easy to achieve epicyclic gear system having improved timing. For example, the gear cluster can be made using conventional manufacturing techniques. By changing the reference frame by which each gear cluster is inspected, gear clusters can be collected into groups where the large diameter and small diameter planet gears will better align along pitch curves 86A and 88A. The present invention also includes measuring dimensions between pitch points 82A and 84A to improve machining of the final dimension of gear tooth 70A such that the gear clusters can be sorted into fewer groups or grouping can be eliminated altogether.

Figure 5:
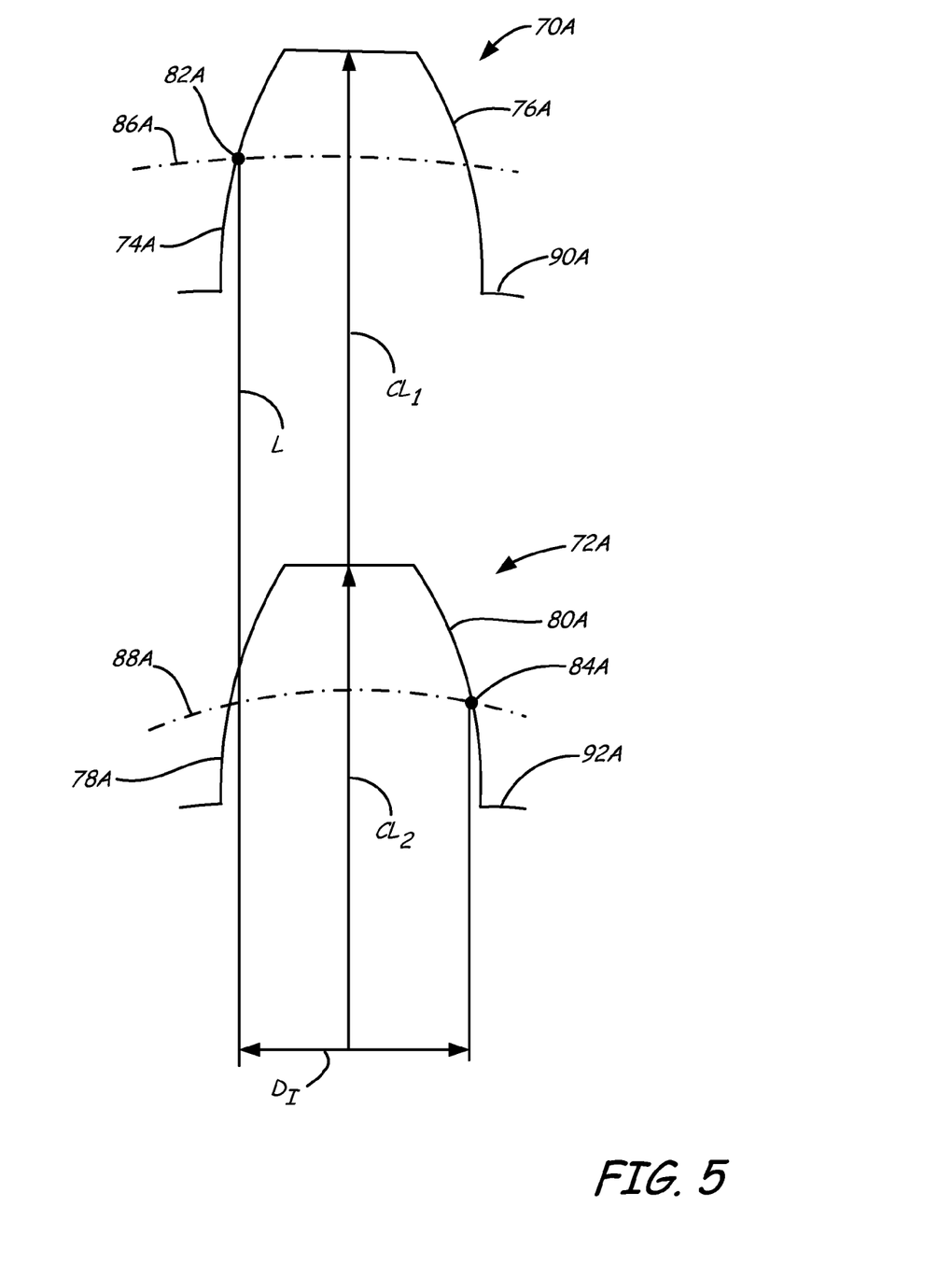
FIG. 5 is a schematic front view of a planetary gear cluster having teeth timed according to a second embodiment of the present invention involving measuring pitch point center distances and machining.

FIG. 5 is a schematic front view of a planetary gear cluster having gear teeth 70A and 72A timed according to a second embodiment of the present invention involving measuring pitch point centers and machining. Gear teeth 70A and 72A comprise components and features bearing the same name and reference numerals as used in FIG. 4. Gear tooth 70A is, however, manufactured in a different manner. Rather than machining gear tooth 70A using centerlines $CL_1$ and $CL_2$ of each gear tooth for determining a reference dimension, such as manufacturing distance $d_M$, for gear walls 74A and 76A, gear walls 74A and 76A are machined into a precise location using pitch points as a machining reference datum or reference dimension. Specifically, in the embodiment of FIG. 5, inspection distance $D_I$ is used as the manufacturing reference dimension. Gear body 90A and 92A are manufactured using any suitable technique, such as by casting and heat treating. Gear tooth 72A is machined to finished dimensions and gear tooth 70A is machined to rough dimensions using conventional machining techniques. Gear bodies 90A and 92A are assembled using conventional techniques, such as welding. Gear bodies 90A and 92A may also be produced from a single part and therefore not require any assembly. Rough timing of gear teeth 70A and 72A is provided by aligning the centers of each gear tooth before assembly of the gear bodies. Final timing of gear teeth 70A and 72A is provided by machining tooth wall 74A to intersect the desired location of pitch point 82A.

In the embodiment of FIG. 5, the straight line inspection distance $D_I$ is determined between pitch point 82A and pitch point 84A. The position of pitch point 84A is fixed with respect to gear bodies 90A and 92A when the gear bodies become assembled. The gear cluster comprising gear bodies 90A and 92A is then positioned in an appropriate vice or fixture to fix the location of the gear cluster with respect to machining equipment, as is known in the art. Distance $D_I$, which extends parallel to a tangent line to pitch curve 88A at the center of gear tooth 70A, is measured from pitch point 84A. Subsequently, line L, which extends perpendicular to the line representing distance $D_I$ (or parallel to the line tangent to pitch curve 88A at the gear tooth center) is measured to intersect pitch curve 86A. The intersection of pitch curve 86A with line L represents the location of pitch point 82A and a position through which tooth wall 74A must extend along its desired curvature or geometry. The nominal thickness of tooth 70A is then used to determine the position of tooth wall 76A. The desired location for pitch point 82A, tooth wall 74A and tooth wall 76A is marked or otherwise located on the rough shape of gear tooth 70A. For example, the profile of the final dimensions of gear tooth 70A can be physically identified, such as with a marking pen, or virtually identified, such as digitally within a computer machining program or CNC (computed numerically controlled) machine. The final shape of gear tooth 70A is then formed using the machining equipment to extend tooth wall 74A through the marked location of pitch point 82A and to extend tooth wall 76A along the commensurate path to form the tooth geometry having the desired nominal thickness of tooth 70A. Consistent with the method of FIG. 4, gear teeth 70A and 72A are inspected by measuring distance $D_I$ between pitch point to determine if the timing of the gear cluster is within an acceptable tolerance band.

In the embodiment of FIG. 5, centerlines $CL_1$ and $CL_2$ are used only to provide rough timing between teeth 70A and 72A. Precise timing is provided using inspection dimension $D_I$. Thus, reliance on centerlines $CL_1$ and $CL_2$ for determining gear tooth timing is reduced, with increased emphasis on the actual working surfaces, tooth walls 74A and 80A. Distance $D_I$ represents a known parameter that will produce the desired timing relationship between pitch point 82A and pitch point 84A. It should be noted that the nominal thicknesses of tooth 70A and 72A need not be the same. It is more important that distance $D_I$ be consistent between tooth pairs on gear bodies 90A and 92A. Likewise, it is not necessary for the centers of gear teeth 70A and 72A to align. It is more important that the angle between the gear centers is consistent between tooth pairs on gear bodies 90A and 92A.

Figure 6:
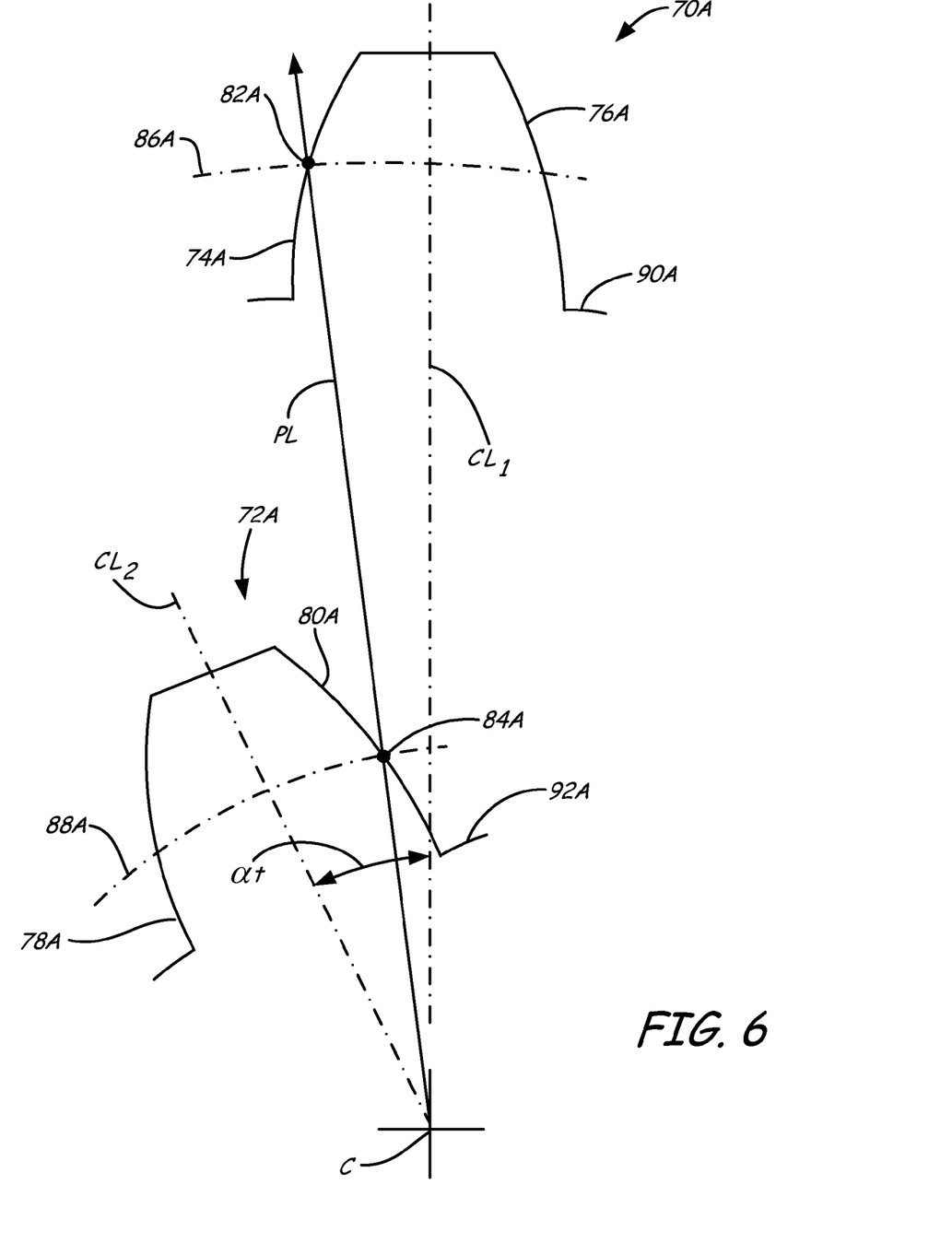
FIG. 6 is a schematic front view of a planetary gear cluster having teeth timed according to a third embodiment of the present invention involving clocking pitch point angles and machining.

FIG. 6 is a schematic front view of a planetary gear cluster having teeth 70A and 72A timed according to a third embodiment of the present invention involving clocking pitch points and machining. Gear teeth 70A and 72A comprise components and features bearing the same name and reference numerals as used in FIG. 5. Gear tooth 70A is, however, manufactured in by clocking pitch line PL between center line $CL_1$ of gear body 70A and center line $CL_2$ of gear body 72A. As discussed with reference to FIG. 5, gear body 92A is manufactured with gear tooth 72A being made to final dimensions. Gear body 90A is manufactured with gear tooth 70A being made only to rough dimensions. Gear bodies 90A and 92A are assembled together into a gear cluster using center lines $CL_1$ and $CL_2$ for rough timing. Center line $CL_1$ extends from gear cluster center C through the midpoint between tooth walls 74A and 76A. Center line $CL_2$ extends from gear cluster center C through the midpoint between tooth walls 78A and 80A. Thus, timing angle $\alpha_t$ represents a known parameter that will produce the desired rough timing relationship between gear tooth 70A and 72A.

The final dimensions of tooth 70A are located by clocking pitch line PL between center lines $CL_1$ and $CL_2$ to determine the precise timing relationship between teeth 70A and 72A. With gear bodies 90A and 92A assembled to each other the precise location of pitch point 82A can be marked using pitch line PL. Specifically, pitch line PL is extended from gear cluster center C, through pitch point 84A on gear tooth 72A and out to pitch curve 86A. The location of pitch point 82A is marked at the intersection of pitch curve 86A and pitch line PL. The desired nominal thickness of tooth 70A is then used to mark the position of tooth wall 76A. As described with reference to FIG. 5, the final geometry of gear tooth 70A can then be machined using conventional machining techniques, such as with the aid of computer controlled manufacturing processes. After machining, gear teeth 70A and 72A are inspected by measuring the angle formed between lines extending through gear cluster center C and pitch points 82A and 84A, respectively. Such an angle should fall within an acceptable tolerance band. In the embodiment of FIG. 6, timing angle $\alpha_t$ is used as the manufacturing reference dimension, and the angle between pitch point 82A and 84A is used as the inspection dimension. As with the embodiment of FIG. 5, the embodiment of FIG. 6 reduces reliance on centerlines $CL_1$ and $CL_2$ in determining gear timing, with increased emphasis on the working surfaces where gear performance is more closely impacted.

The present invention provides methods for producing gear clusters having improved gear tooth timing. The methods involve dimensioning between work surfaces, such as the tooth walls, of the individual gears of the gear cluster, rather than between other, non-working reference positions, such as gear tooth centers. In particular, the pitch points where intermeshing gear teeth meet are used to provide consistent interaction between different gear clusters. As such, in various methods of the present invention, finished gear clusters are inspected by dimensioning between pitch points, rather than gear tooth centers. The methods can be used in any gear cluster that is loaded in a single direction, e.g. wherein one gear is driven in one direction and the other gear is used as a driver in the same direction. The invention improves performance of gear systems where timing is critical, such as in planetary systems, position sensitive gearboxes, actuation mechanisms and the like.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A method of manufacturing a gear cluster having a first gear body and a second gear body, the method comprising:

producing a first set of gear teeth on the first gear body, each tooth on the first set of gear teeth having a first pitch point;

determining a timing position for a second set of gear teeth on the second gear body by dimensioning from a first pitch point of the first set of gear teeth, wherein the first gear body is axially aligned with the second gear body;

producing a second set of gear teeth on the second gear body based on the timing position, each tooth on the second set of gear teeth having a second pitch point; and inspecting the gear cluster for timing position by measuring a reference dimension between the first pitch point and the second pitch point.

2. The method of claim 1 wherein the timing position of the second set of gear teeth comprises a rotational orientation of the second set of gear teeth with respect to the first set of gear teeth.

3. The method of claim 2 wherein the first pitch points are located on first drive sides of teeth in the first set of gear teeth and the second pitch points are located on second drive sides of teeth in the second set of gear teeth.

4. The method of claim 3 wherein the step of timing from the first set of gear teeth comprises dimensioning from a first pitch point to a second pitch point.

5. The method of claim 4 wherein the step of dimensioning from the first pitch point to the second pitch point comprises:

measuring a straight line distance between the first pitch point on the drive side of the first gear body and the second pitch point on the drive side of the second gear body.

6. The method of claim 4 wherein the step of dimensioning from the first pitch point to the second pitch point comprises:

clocking an angle between a first line extending from a center of the gear cluster to the first pitch point on the drive side of the first gear body and a second line extending from the center of the gear cluster to the second pitch point on the drive side of the second gear body.

7. The method of claim 4 wherein the step of producing the second set of gear teeth on the second gear body comprises machining flanks of the second set of gear teeth to intersect the second pitch point.

8. The method of claim 4 wherein drive sides of the second set of gear teeth are located on flanks of the second set of gear teeth opposite flanks of the first set of gear teeth on which the drive sides of the first set of gear teeth are located.

9. The method of claim 3 and further comprising the steps of:

placing the gear cluster into a group of gear clusters having dimensioning between pitch points within a tolerance band of each other.

10. The method of claim 9 and further comprising:

determining the timing position for the second set of gear teeth by dimensioning from a first midpoint on the first set of gear teeth to a second midpoint on the second set of gear teeth.

11. The method of claim 1 and further comprising the step of attaching the second gear body to the first gear body before producing the second set of gear teeth on the second gear body.

12. A method for manufacturing a gear cluster, the method comprising:

producing a first gear body;

machining a first set of gear teeth having final dimensions on the first gear body, each tooth on the first set of gear teeth having a first pitch point;

producing a second gear body;

machining a second set of gear teeth having rough dimensions on the second gear body;

determining a timing position for a second pitch point on each tooth in the second set of gear teeth by referencing from one of the first pitch points, wherein the first gear body is axially aligned with the second gear body;

machining the second set of gear teeth to final dimensions such that a flank of each gear tooth in the second set of gear teeth passes through one of the second pitch points; and inspecting the gear cluster by measuring between one of the first pitch points and one of the second pitch points.

13. The method of manufacturing a gear cluster of claim 12 and further comprising the step of:

rough timing the first set of gear teeth having final dimensions and the second set of gear teeth having rough dimensions before attaching the second gear body to the first gear body.

14. The method of manufacturing a gear cluster of claim 12 wherein:

the first pitch points are located on first drive sides of teeth in the first set of gear teeth and the second pitch points are located on second drive sides of teeth in the second set of gear teeth; and wherein the first drive sides of the first set of gear teeth and the second drive sides of the second set of gear teeth are located on opposite sides of flanks of the respective gear teeth.

15. The method of manufacturing a gear cluster of claim 14 wherein the step of determining a timing position for the second pitch points of the teeth in the second set of gear teeth comprises:

measuring a straight line distance between a first pitch point on the drive side of the first gear body and a second pitch point on the drive side of the second gear body.

16. The method of manufacturing a gear cluster of claim 14 wherein the step of determining a timing position for the second pitch point of each of the teeth in the second set of gear teeth comprises:

clocking an angle between a first line extending from a center of the gear cluster to a first pitch point on the drive side of the first gear body and a second line extending from the center of the gear cluster to a second pitch point on the drive side of the second gear body.

17. The method of manufacturing a gear cluster of claim 12 wherein timing of the first gear body with respect to the second gear body comprises a rotational orientation of the second set of gear teeth with respect to the first set of gear teeth.

18. A method of manufacturing a gear cluster from a first gear body and a second gear body, the method comprising:

producing a first set of gear teeth on the first gear body, each tooth on the first set of gear teeth having a first pitch point located on first drive sides of teeth in the first set of gear teeth;

determining a timing position for a second set of gear teeth on the second gear body by dimensioning from the first set of gear teeth, wherein the first gear body is axially aligned with the second gear body;

producing a second set of gear teeth on the second gear body based on the timing position, each tooth on the second set of gear teeth having a second pitch point located on second drive sides of teeth in the second set of gear teeth; and inspecting the gear cluster for timing position by measuring a reference dimension between the first pitch point and the second pitch point;

wherein the timing position of the second set of gear teeth comprises a rotational orientation of the second set of gear teeth with respect to the first set of gear teeth; and the step of timing from the first set of gear teeth comprises dimensioning from a first pitch point to a second pitch point.

19. The method of claim 18 wherein the step of dimensioning from the first pitch point to the second pitch point comprises:

measuring a straight line distance between the first pitch point on the drive side of the first gear body and the second pitch point on the drive side of the second gear body.

20. The method of claim 18 wherein the step of dimensioning from the first pitch point to the second pitch point comprises:

clocking an angle between a first line extending from a center of the gear cluster to the first pitch point on the drive side of the first gear body and a second line extending from the center of the gear cluster to the second pitch point on the drive side of the second gear body.

\* \* \* \* \*